(12) United States Patent
Shen et al.

(10) Patent No.: US 9,582,669 B1
(45) Date of Patent: *Feb. 28, 2017

(54) SYSTEMS AND METHODS FOR DETECTING DISCREPANCIES IN AUTOMOBILE-NETWORK DATA

(71) Applicant: Symantec Corporation, Mountain View, CA (US)

(72) Inventors: Yun Shen, Dublin (IE); Nathan Evans, Sterling, VA (US); Azzedine Benameur, Fairfax Station, VA (US)

(73) Assignee: Symantec Corporation, Mountain View, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 14/525,715

(22) Filed: Oct. 28, 2014

(51) Int. Cl.
| | |
|---|---|
| *G06F 7/04* | (2006.01) |
| *G06F 17/30* | (2006.01) |
| *H04N 7/16* | (2011.01) |
| *G06F 21/60* | (2013.01) |
| *G06F 21/57* | (2013.01) |

(52) U.S. Cl.
CPC ............ *G06F 21/60* (2013.01); *G06F 21/57* (2013.01); *G06F 2221/034* (2013.01)

(58) Field of Classification Search
CPC ............................................. G06F 2221/034
USPC ........................................................ 726/26
See application file for complete search history.

(56) References Cited

U.S. PATENT DOCUMENTS

| | | | |
|---|---|---|---|
| 8,781,504 B1 * | 7/2014 | Liu .................. | H04W 4/028 340/10.1 |
| 8,918,244 B2 * | 12/2014 | Brzezinski ......... | H04L 67/1095 701/31.4 |
| 8,925,037 B2 | 12/2014 | Marino et al. | |
| 8,973,133 B1 | 3/2015 | Cooley | |
| 9,053,516 B2 * | 6/2015 | Stempora ............... | G06Q 40/08 |
| 2013/0212659 A1 * | 8/2013 | Maher ..................... | H04L 63/06 726/6 |

(Continued)

OTHER PUBLICATIONS

Tobias Hoppe, Stefan Kiltz, Jana Dittmann "Adaptive Dynamic Reaction to Automotive IT Security Incidents Using Multimedia Car Environment" Published in: http://ieeexplore.ieee.org/xpl/mostRecentIssue.jsp?punumber=4627042 Date of Conference: Sep. 8-10, 2008, pp. 295-298, Print ISBN: 978-0-7695-3324-7.*

(Continued)

*Primary Examiner* — Morshed Mehedi
*Assistant Examiner* — Khalil Naghdali
(74) *Attorney, Agent, or Firm* — FisherBroyles LLP (57) ABSTRACT

The disclosed computer-implemented method for detecting discrepancies in automobile-network data may include (1) receiving data that indicates at least one attribute of an automobile and that was conveyed via an automobile-network message that was purportedly broadcast over an automobile network of the automobile, (2) receiving additional data that indicates the same attribute of the automobile and that was not conveyed via any automobile-network message that was broadcast over the automobile network, (3) detecting a discrepancy between the data and the additional data, and (4) performing a security action in response to detecting the discrepancy between the data and the additional data. Various other methods, systems, and computer-readable media are also disclosed.

13 Claims, 8 Drawing Sheets

(56) References Cited

U.S. PATENT DOCUMENTS

| | | | | |
|---|---|---|---|---|
| 2013/0302758 A1* | 11/2013 | Wright | ............... | G07C 5/008 434/65 |
| 2015/0254719 A1* | 9/2015 | Barfield, Jr. | ....... | G06Q 30/0265 705/14.53 |

OTHER PUBLICATIONS

Nathan Evans, et al; Systems and Methods for Detecting Anomalous Messages in Automobile Networks; U.S. Appl. No. 14/525,792, filed Oct. 28, 2014.

Nathan Evans, et al; Systems and Methods for Evaluating Electronic Control Units Within Vehicle Emulations; U.S. Appl. No. 14/671,036, filed Mar. 27, 2015.

"Volvo tests Cloud-based V2V ice warning concept", http://telematicsnews.info/2014/03/19/volvo-tests-cloud-based-v2v-ice-warning-sharing_m5202/, as accessed Aug. 29, 2014, Telematics News, (Mar. 19, 2014).

"EMI/ESD Protection Solutions for the CAN Bus", http://www.onsemi.com/pub_link/Collateral/AND8169-D.PDF, as accessed Aug. 29, 2014, Publication Order No. AND8169/D, ON Semiconductor, Semiconductor Components Industries, LLC, (Jun. 2014—Rev. 2).

Lepkowski, J. et al., "EMI/ESD protection solutions for the CAN bus", http://www.can-cia.org/fileadmin/cia/files/icc/10/cia_paper_lepkowski.pdf, as accessed Aug. 29, 2014, iCC 2005, CAN in Automation, (2005).

Wolf, Marko et al., "Security in Automotive Bus Systems", http://www.weika.eu/papers/WolfEtAl_SecureBus.pdf, as accessed Aug. 29, 2014, (2004).

Kleberger, Pierre et al., "Security Aspects of the In-Vehicle Network in the Connected Car", Intelligent Vehicles Symposium (IV), 2011 IEEE, Baden-Baden, Germany, (Jun. 5-9, 2011), pp. 528-533.

Ben Othmane, Lotfi et al., "Towards Extended Safety in Connected Vehicles", Proceedings of the 16th International IEEE Annual Conference on Intelligent Transportation Systems (ITSC 2013). The Hague, The Netherlands, (Oct. 6-9, 2013).

Muter, M. et al., "A structured approach to anomaly detection for in-vehicle networks", 2010 Sixth International Conference on Information Assurance and Security (IAS), Atlanta, GA, (Aug. 23-25, 2010), pp. 92-98.

Muter, M. et al., "Entropy-based anomaly detection for in-vehicle networks", 2011 IEEE Intelligent Vehicles Symposium (IV), DOI: 10.1109/IVS.2011.5940552, Baden-Baden, Germany, (Jun. 5-9, 2011), pp. 1110-1115.

"Driver Feedback™" https://play.google.com/store/apps/details?id=com.statefarm.driverfeedback, as accessed Aug. 29, 2014, State Farm Insurance, Android Apps on Google Play, (Jun. 2, 2013).

"Controller Area Network (CAN) Overview", http://www.ni.com/white-paper/2732/en/, as accessed Aug. 29, 2014, National Instruments Corporation, (Aug. 1, 2014).

"CAN protocol specification", http://www.can-cia.org/index.php?id=164, as accessed Aug. 29, 2014, (Oct. 17, 2010).

"FlexRay Automotive Communication Bus Overview", http://www.ni.com/white-paper/3352/en/, as accessed Aug. 29, 2014, National Instruments Corporation, (Aug. 21, 2009).

"Snapshot®", https://www.progressive.com/auto/snapshot/, as accessed Aug. 29, 2014, Progressive Casualty Insurance Company, (Mar. 8, 2013).

"Bourns® Type 6002 Non-contacting Steering Angle Sensor", http://www.we-conect.com/cms/media/uploads/events/415/dokumente/Bourns_-_Non-Contacting_Steering_Angle_Sensor_Type_6002.pdf, as accessed Aug. 29, 2014, (On or before Aug. 29, 2014).

Miller, Charlie et al., "A Survey of Remote Automotive Attack Surfaces", http://www.ioactive.com/pdfs/Remote_Automotive_Attack_Surfaces.pdf, as accessed Aug. 29, 2014, Black Hat USA 2014, Las Vegas, NV, (Aug. 2-7, 2014).

Regev, Alon et al., "Automotive Ethernet Security Testing", http://standards.ieee.org/events/automotive/2014/20_Automotive_Ethernet_Security_Testing.pdf, as accessed Feb. 9, 2015, (2014).

Koscher, Karl et al., "Experimental Security Analysis of a Modern Automobile", http://www.autosec.org/pubs/cars-oakland2010.pdf, as accessed Feb. 9, 2015, 2010 IEEE Symposium on Security and Privacy, (2010).

Bayer, Stephanie et al., "Automotive Security Testing—The Digital Crash Test", http://www.sia.fr/images/images/Image/Evenements/2014/CESA/available%20papers/09_Bayer_Escrypt.pdf, as accessed Feb. 9, 2015, 3rd CESA Automotive Electronics Congress (CESA 3.0), Paris, France, (Dec. 3-4, 2014).

"Electronic control unit", https://en.wikipedia.org/wiki/Electronic_control_unit, as accessed Feb. 9, 2015, Wikipedia, (Jul. 28, 2004).

"Vehicle bus", https://en.wikipedia.org/wiki/Vehicle_bus, as accessed Feb. 9, 2015, Wikipedia, (May 12, 2005).

"Hardware emulation", https://en.wikipedia.org/wiki/Hardware_emulation, as accessed Feb. 9, 2015, Wikipedia, (Sep. 13, 2006).

"Emulation", https://en.wikipedia.org/wiki/Emulation, as accessed Feb. 9, 2015, Wikipedia, (Dec. 3, 2003).

* cited by examiner

FIG. 8

SYSTEMS AND METHODS FOR DETECTING DISCREPANCIES IN AUTOMOBILE-NETWORK DATA

BACKGROUND

Most modern automobiles operate via the correct functioning of various discrete electronic control units (ECUs), sensors, and/or actuators that communicate over one or more in-vehicle automobile networks (e.g., Controller Area Networks (CANs) and FlexRay Networks). Various attributes (such as, e.g., speed, acceleration, deceleration, turning angle, pedal position, etc.) of an automobile may be reported by the automobile's ECUs, sensors, and/or actuators via automobile-network messages broadcast over the automobile's networks.

It is becoming increasingly common for certain entities (e.g., auto-insurance providers) to monitor how automobiles are being driven by collecting automobile-network messages via logging devices (e.g., dongles) that are intended to be plugged directly into the automobiles' networks. Unfortunately, monitoring how automobiles are being driven in this way may present unwanted limitations. For example, a dishonest driver may be able to cover up periods of unsafe or aggressive driving by causing a logging device to log fake or falsified automobile-network messages during the periods of unsafe or aggressive driving. In one example, a driver may collect automobile-network messages during a period of safe driving, and playback these automobile-network messages to a logging device during periods of unsafe or aggressive driving. In another example, a driver may use a pass-through device that sits between an automobile network and a logging device and that modifies automobile-network messages to appear as a result of safe driving before they reach and are logged by the logging device. Accordingly, the instant disclosure identifies and addresses a need for additional and improved systems and methods for detecting discrepancies in automobile-network data.

SUMMARY

As will be described in greater detail below, the instant disclosure describes various systems and methods for detecting discrepancies in automobile-network data. In one example, a computer-implemented method for detecting discrepancies in automobile-network data may include (1) receiving data that indicates at least one attribute of an automobile and that was conveyed via an automobile-network message that was purportedly broadcast over an automobile network of the automobile, (2) receiving additional data that indicates the same attribute of the automobile and that was not conveyed via any automobile-network message that was broadcast over the automobile network, (3) detecting a discrepancy between the data and the additional data, and (4) performing a security action in response to detecting the discrepancy between the data and the additional data.

In some embodiments, the data may be received from a logging device that is configured to (1) connect to the automobile network via a port of the automobile network and (2) log automobile-network messages that are broadcast over the automobile network and that convey states of the attribute of the automobile. In some embodiments, the additional data may be received from one or more sensors of a mobile device, and the mobile device may be traveling with the automobile when the automobile-network message was logged by the logging device. In at least one embodiment, the additional data may be conveyed via an additional automobile-network message that was broadcast over an additional automobile network of the automobile.

In some embodiments, the data may be received from the logging device by the mobile device, the steps of detecting the discrepancy and performing the security action may be performed by the mobile device, and the step of performing the security action may include reporting the discrepancy to a cloud-based computing system.

In some embodiments, the data may be received from the logging device by a cloud-based computing system, the additional data may be received from the mobile device by the cloud-based computing system, and the steps of detecting the discrepancy and performing the security action may be performed by the cloud-based computing system.

In some embodiments, the step of detecting the discrepancy between the data and the additional data may include determining that the discrepancy is indicative of the automobile-network message having been tampered with, and the step of performing the security action may include flagging the data as having been tampered with.

In some embodiments, the step of detecting the discrepancy between the data and the additional data may include determining that the discrepancy is indicative of the automobile-network message having been falsified, and the step of performing the security action may include flagging the data as having been falsified.

In some embodiments, the step of detecting the discrepancy between the data and the additional data may include determining that the discrepancy is indicative of the automobile-network message having been collected from a replay device that replayed the automobile-network message, and the step of performing the security action may include flagging the data as having been collected from the replay device.

In some embodiments, the step of detecting the discrepancy between the data and the additional data may include determining that the discrepancy is indicative of the automobile-network message having been collected from a filtering device that filtered the automobile-network message, and the step of performing the security action may include flagging the data as having been collected from the filtering device.

In some embodiments, the automobile-network message may be broadcast over the automobile network by a source device (e.g., an ECU, a sensor, and/or an actuator) connected to the automobile network. In some embodiments, the step of detecting the discrepancy between the data and the additional data may include determining that the discrepancy is indicative of the source device having malfunctioned. In other embodiments, the step of detecting the discrepancy between the data and the additional data may include determining that the discrepancy is indicative of the source device having broadcast the automobile-network message as part of an attack on the automobile network.

In one embodiment, a system for implementing the above-described method may include (1) at least one receiving module, stored in memory, that receives (a) data that indicates at least one attribute of an automobile and that was conveyed via an automobile-network message that was purportedly broadcast over an automobile network of the automobile and (b) additional data that indicates the same attribute of the automobile and that was not conveyed via any automobile-network message that was broadcast over the automobile network, (2) a detecting module, stored in memory, that detects a discrepancy between the data and the additional data, (3) a security module, stored in memory, that performs a security action in response to detecting the discrepancy between the data and the additional data, and (4) at least one processor that executes the receiving module, the detecting module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive data that indicates at least one attribute of an automobile and that was conveyed via an automobile-network message that was purportedly broadcast over an automobile network of the automobile, (2) receive additional data that indicates the same attribute of the automobile and that was not conveyed via any automobile-network message that was broadcast over the automobile network, (3) detect a discrepancy between the data and the additional data, and (4) perform a security action in response to detecting the discrepancy between the data and the additional data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting discrepancies in automobile-network data. As will be explained in greater detail below, by comparing (1) automobile-network data that was conveyed by automobile-network messages purportedly broadcast over an automobile network of an automobile with (2) additional data that conveys the same or similar information and that has been acquired from an alternative source (e.g., a source other than automobile-network messages broadcast over the automobile network), the systems and methods described herein may detect when the automobile-network data has been tampered with, played back, and/or otherwise falsified. For example, by identifying a discrepancy between (1) automobile-network data that indicates an attribute of an automobile (e.g., speed, acceleration, etc.) that was conveyed by automobile-network messages purportedly broadcast over an automobile network of the automobile and (2) additional data that indicates the same attribute of the automobile but that was collected via sensors of a mobile device (e.g., a smartphone) travelling with the automobile, these systems and methods may determine that the automobile-network data was tampered with, played back, and/or otherwise falsified.

Furthermore, in some examples, by comparing (1) automobile-network data that was actually conveyed by automobile-network messages broadcast over an automobile network of an automobile with (2) additional data that conveys the same or similar information and that has been acquired from an alternative source, the systems and methods described herein may detect attacks on the automobile network and/or malfunctioning components within the automobile network. Embodiments of the instant disclosure may also provide various other advantages and features, as discussed in greater detail below.

The following will provide, with reference to FIGS. 1-5, detailed descriptions of exemplary systems for detecting discrepancies in automobile-network data. Detailed descriptions of corresponding computer-implemented methods will also be provided in connection with FIG. 7. In addition, detailed descriptions of an exemplary automobile network and an exemplary computing system capable of implementing one or more of the embodiments described herein will be provided in connection with FIGS. 6 and 8, respectively.

Figure 1:
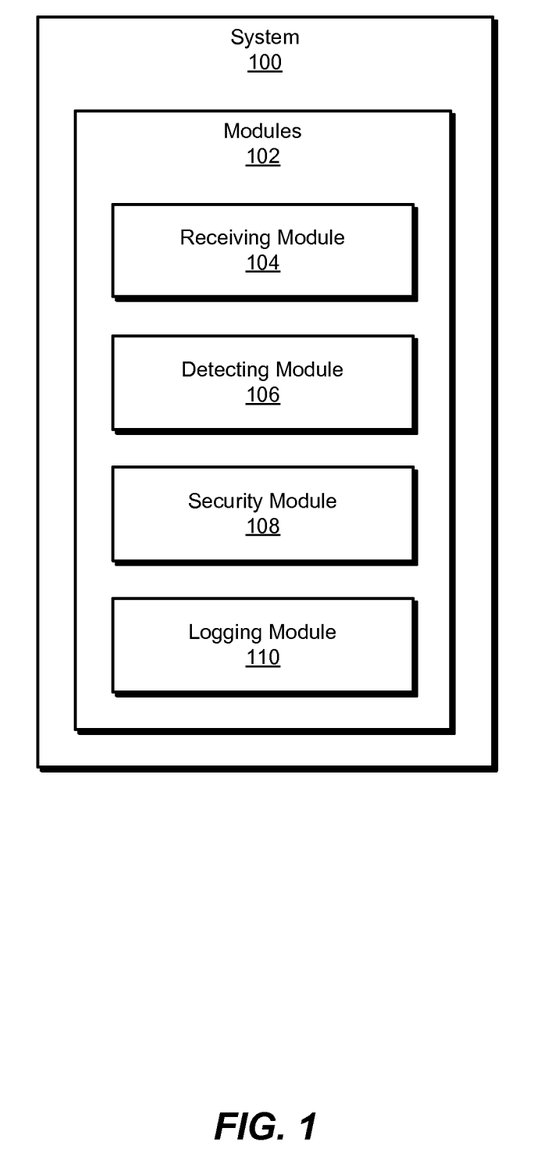
FIG. 1 is a block diagram of an exemplary system for detecting discrepancies in automobile-network data.

FIG. 1 is a block diagram of an exemplary system 100 for detecting discrepancies in automobile-network data. As illustrated in this figure, exemplary system 100 may include one or more modules 102 for performing one or more tasks. For example, and as will be explained in greater detail below, exemplary system 100 may include a receiving module 104 that receives (a) data that indicates at least one attribute of an automobile and that was conveyed via an automobile-network message that was purportedly broadcast over an automobile network of the automobile and (b) additional data that indicates the same attribute of the automobile and that was not conveyed via any automobile-network message that was broadcast over the automobile network. Exemplary system 100 may also include a detecting module 106 that detects a discrepancy between the data and the additional data.

In addition, and as will be described in greater detail below, exemplary system 100 may include a security module 108 that performs a security action in response to detecting the discrepancy between the data and the additional data. In some examples, exemplary system 100 may also include a logging module 110 that logs the data and/or the additional data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIGS. 2-6 (e.g., computing device 202, mobile device 206, and/or server 208 in FIG. 2) and/or computing system 810 in FIG. 8. One or more of modules 102 in FIG. 1 may also represent all or portions of one or more special-purpose computers configured to perform one or more tasks.

Figure 2:
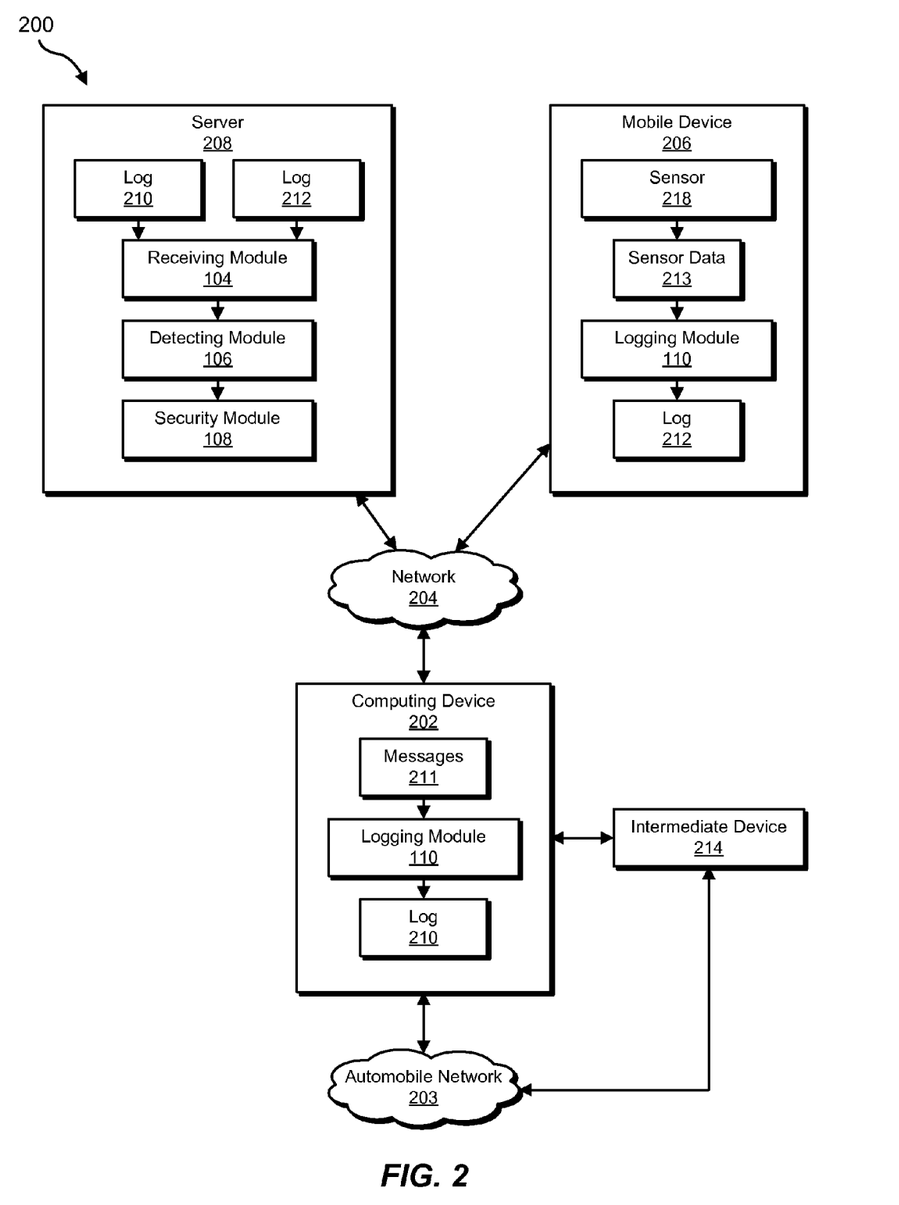
FIG. 2 is a block diagram of an additional exemplary system for detecting discrepancies in automobile-network data.

Exemplary system 100 in FIG. 1 may be implemented in a variety of ways. For example, all or a portion of exemplary system 100 may represent portions of exemplary system 200 in FIG. 2. As shown in FIG. 2, system 200 may include (1) a computing device 202 that is connected to an automobile network 203 of an automobile, (2) a mobile device 206 that may travel with the automobile, and (3) a server 208 in communication with computing device 202 and mobile device 206 via a network 204. In some examples, computing device 202 may be connected to automobile network 203 via an intermediate device 214 (e.g., a replay or filtering device).

In one embodiment, one or more of modules 102 from FIG. 1 may, when executed by at least one processor of computing device 202, mobile device 206, and/or server 208, enable server 208 to detect discrepancies in automobile-network data that was actually or purportedly broadcast over automobile network 203 and logged by computing device 202. For example, and as will be described in greater detail below, one or more of modules 102 may cause server 208 to (1) receive, from computing device 202, log 210 that indicates at least one attribute of the automobile of which automobile network 203 is a part, (2) receive, from mobile device 206, log 212 that indicates the same attribute of the automobile, (3) detect a discrepancy between log 210 and log 212, and (4) perform a security action in response to detecting the discrepancy between log 210 and log 212. In this example, log 210 may include information conveyed by automobile-network messages 211 that were actually or purportedly broadcast over automobile network 203, and log 212 may include information conveyed by sensor data 213 received from sensor 218. In at least one example, automobile-network messages 211 may have been generated or modified by intermediate device 214.

Figure 3:
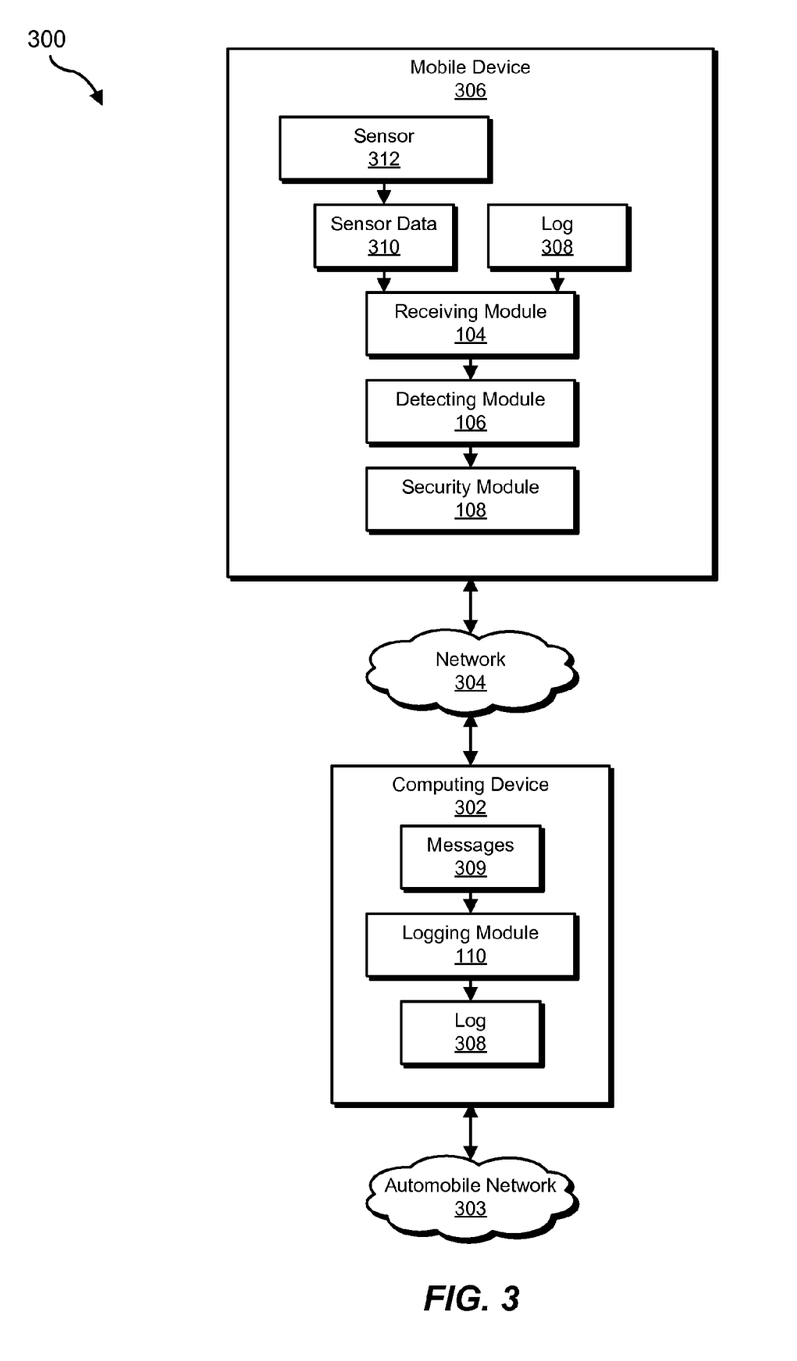
FIG. 3 is a block diagram of an additional exemplary system for detecting discrepancies in automobile-network data.

FIG. 3. illustrates an additional or alternative exemplary implementation of exemplary system 100 in FIG. 1. As shown in FIG. 3, system 300 may include (1) a computing device 302 that is connected to an automobile network 303 of an automobile and (2) a mobile device 306 that may travel with the automobile and that may communicate with computing device 302 via a network 304.

In one embodiment, one or more of modules 102 from FIG. 1 may, when executed by at least one processor of computing device 302 and/or mobile device 306, enable mobile device 306 to detect discrepancies in automobile-network data that was actually or purportedly broadcast over automobile network 303 and logged by computing device 302. For example, and as will be described in greater detail below, one or more of modules 102 may cause mobile device 306 to (1) receive log 308 that indicates at least one attribute of the automobile of which automobile network 303 is a part, (2) receive sensor data 310 that indicates the same attribute of the automobile, (3) detect a discrepancy between log 308 and sensor data 310, and (4) perform a security action in response to detecting the discrepancy between log 308 and sensor data 310. In this example, log 308 may include information conveyed by automobile-network messages 309 that were actually or purportedly broadcast over automobile network 303, and sensor data 310 may include information received from sensor 312 of mobile device 306.

Figure 4:
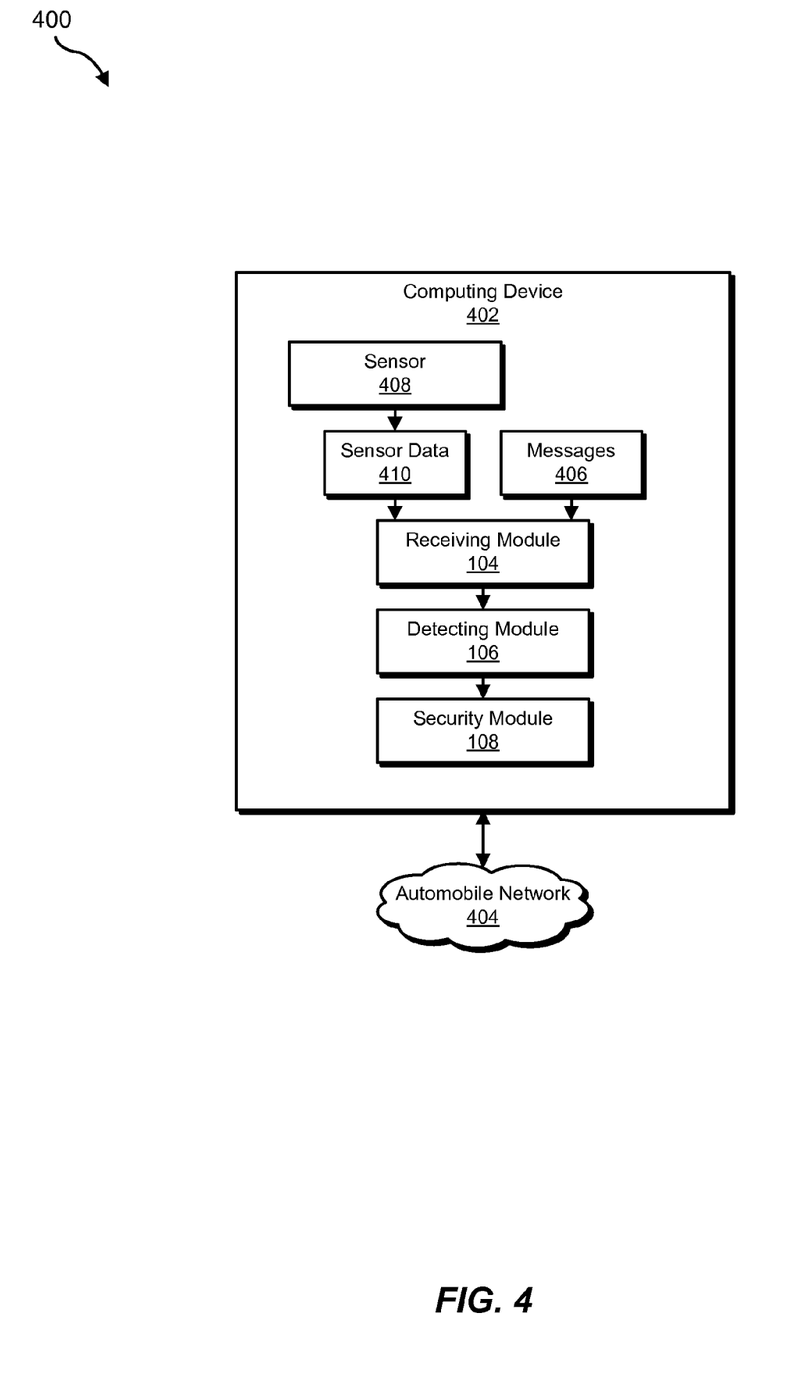
FIG. 4 is a block diagram of an additional exemplary system for detecting discrepancies in automobile-network data.

FIG. 4. illustrates another additional or alternative exemplary implementation of exemplary system 100 in FIG. 1. As shown in FIG. 4, system 400 may include a computing device 402 connected to automobile network 404 of an automobile.

In one embodiment, one or more of modules 102 from FIG. 1 may, when executed by at least one processor of computing device 402, enable computing device 402 to detect discrepancies in automobile-network data that was actually or purportedly broadcast over automobile network 404 and logged by computing device 402. For example, and as will be described in greater detail below, one or more of modules 102 may cause computing device 402 to (1) receive automobile-network messages 406 that indicate at least one attribute of the automobile of which automobile network 403 is a part, (2) receive sensor data 410 that indicates the same attribute of the automobile, (3) detect a discrepancy between automobile-network messages 406 and sensor data 410, and (4) perform a security action in response to detecting the discrepancy between automobile-network messages 406 and sensor data 410. In this example, automobile-network messages 406 may have been actually or purportedly broadcast over automobile network 404, and sensor data 410 may include information received from sensor 408 of computing device 402.

Figure 5:
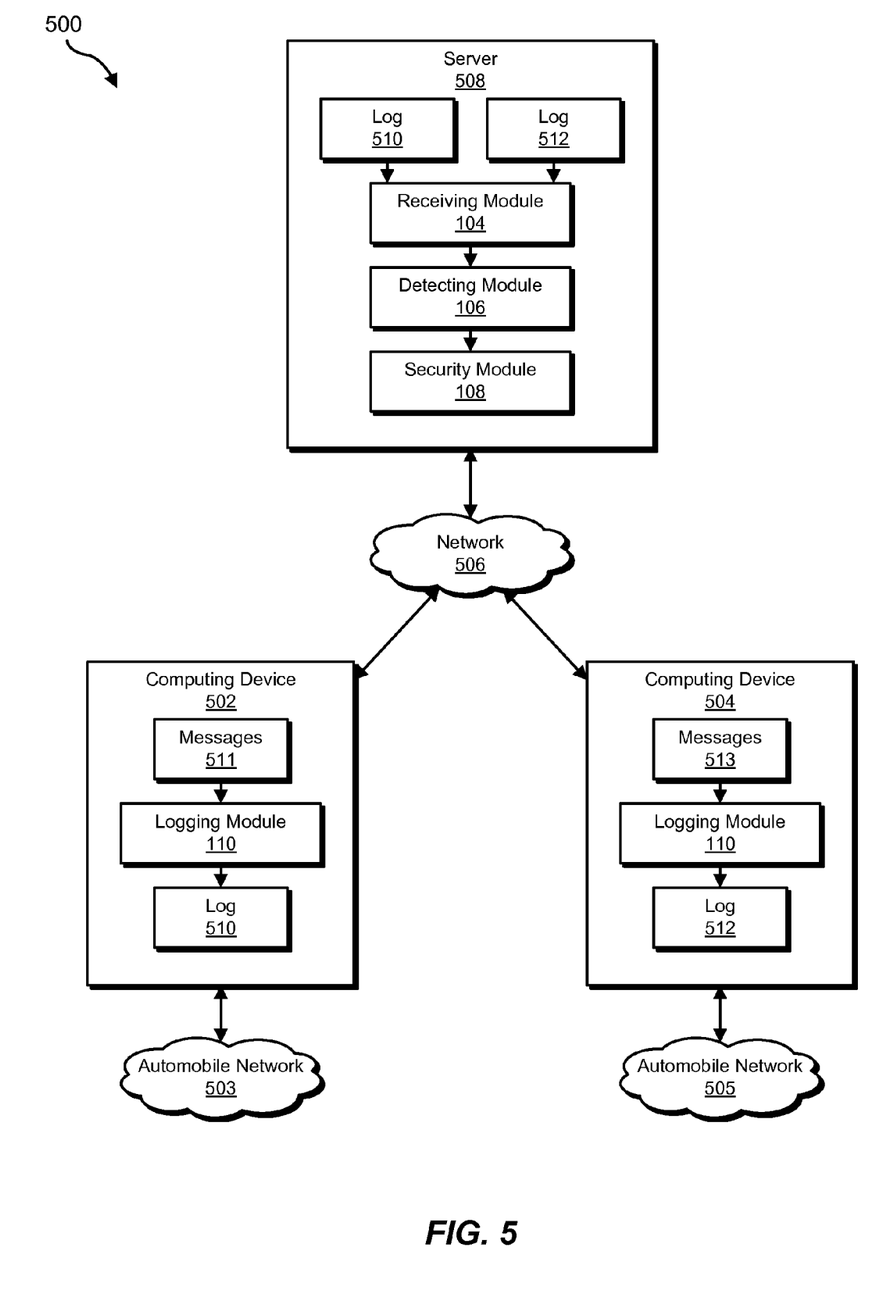
FIG. 5 is a block diagram of an additional exemplary system for detecting discrepancies in automobile-network data.

FIG. 5. illustrates another additional or alternative exemplary implementation of exemplary system 100 in FIG. 1. As shown in FIG. 5, system 500 may include (1) a computing device 502 connected to an automobile network 503 of an automobile, (2) a computing device 504 connected to an additional automobile network 505 of the same automobile, and (3) a server 508 in communication with computing devices 502 and 504 via a network 506.

In one embodiment, one or more of modules 102 from FIG. 1 may, when executed by at least one processor of computing device 502, computing device 504, and/or server 508, enable server 508 to detect discrepancies in automobile-network data that has actually or purportedly been broadcast over automobile network 503 and logged by computing device 502. For example, and as will be described in greater detail below, one or more of modules 102 may cause server 508 to (1) receive log 510 that indicates at least one attribute of the automobile of which automobile networks 503 and 505 are a part, (2) receive log 512 that indicates the same attribute of the automobile, (3) detect a discrepancy between log 510 and log 512, and (4) perform a security action in response to detecting the discrepancy between log 510 and log 512. In this example, log 510 may include information conveyed by automobile-network messages 511 that were actually or purportedly broadcast over automobile network 503, and log 512 may include information conveyed by automobile-network messages 513 that were broadcast over automobile network 505.

In the preceding exemplary implementations of exemplary system 100 in FIG. 1, computing devices 202, 302, 402, 502, and 504 generally represent any type or form of computing device capable of reading computer-executable instructions and/or collecting automobile-network messages that are broadcast over an automobile network. Examples of computing devices 202, 302, 402, 502, and 504 include, without limitation, electronic control units (ECUs), automobile-network dongles, diagnostic devices, embedded systems, laptops, tablets, desktops, servers, cellular phones, Personal Digital Assistants (PDAs), wearable devices (e.g., smart watches, smart glasses, etc.), combinations of one or more of the same, exemplary computing system 810 in FIG. 8, or any other suitable computing device. In at least one example, computing devices 202, 302, 402, 502, and 504 may represent logging devices that (1) are intended to be plugged directly into an automobile's network and/or (2) collect automobile-network messages for the purpose of monitoring driving behaviors.

Automobile networks 203, 303, 404, 503, and 505 generally represent any medium or architecture capable of facilitating communication or data transfer amongst the components (e.g., controllers, sensors, and/or actuators) of an automobile. Examples of automobile networks 203, 303, 404, 503, and 505 include, without limitation, Controller Area Networks (CANs), FlexRay Networks, Local Interconnect Networks (LINs), in-vehicle buses, and/or exemplary automobile network 600 in FIG. 6. Automobile networks 203, 303, 404, 503, and 505 may facilitate communication or data transfer using wireless or wired connections. In some examples, automobile networks 203, 303, 404, 503, and 505 may represent a broadcast and/or serial network.

Mobile devices 206 and 306 generally represent any type or form of portable computing device capable of reading computer-executable instructions. Examples of mobile devices 206 and 306 include, without limitation, laptops, tablets, e-readers, cellular phones, smart phones, Personal Digital Assistants (PDAs), wearable devices (e.g., smart watches, smart glasses, etc.), and/or combinations of one or more of the same.

As shown in FIGS. 2-4, mobile device 206, mobile device 306, and computing device 402 may include a variety of sensors 218, 312, and 408 that may be used to gather information about the states of various attributes of an automobile within which mobile device 206, mobile device 306, or computing device 402 operates. Examples of sensors 218, 312, and 408 include, without limitation, global positioning system (GPS) sensors, accelerometers, gyroscopes, and/or any other sensor capable of gathering information about the states of various attributes of an automobile.

Networks 204, 304, and 506 generally represent any medium or architecture capable of facilitating communication or data transfer. Examples of networks 204, 304, and 506 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a Wi-Fi network or communication channel, a Bluetooth network or communication channel, a Near Field Communication (NFC) network or communication channel, or the like. Networks 204, 304, and 506 may facilitate communication or data transfer using wireless or wired connections.

Servers 208 and 508 generally represent any type or form of computing device that is capable of reading computer-executable instructions. Examples of servers 208 and 508 include, without limitation, application servers and database servers configured to provide various database services and/or run certain software applications. In at least one example, servers 208 and 508 may represent a portion of a cloud-based computing environment.

Figure 6:
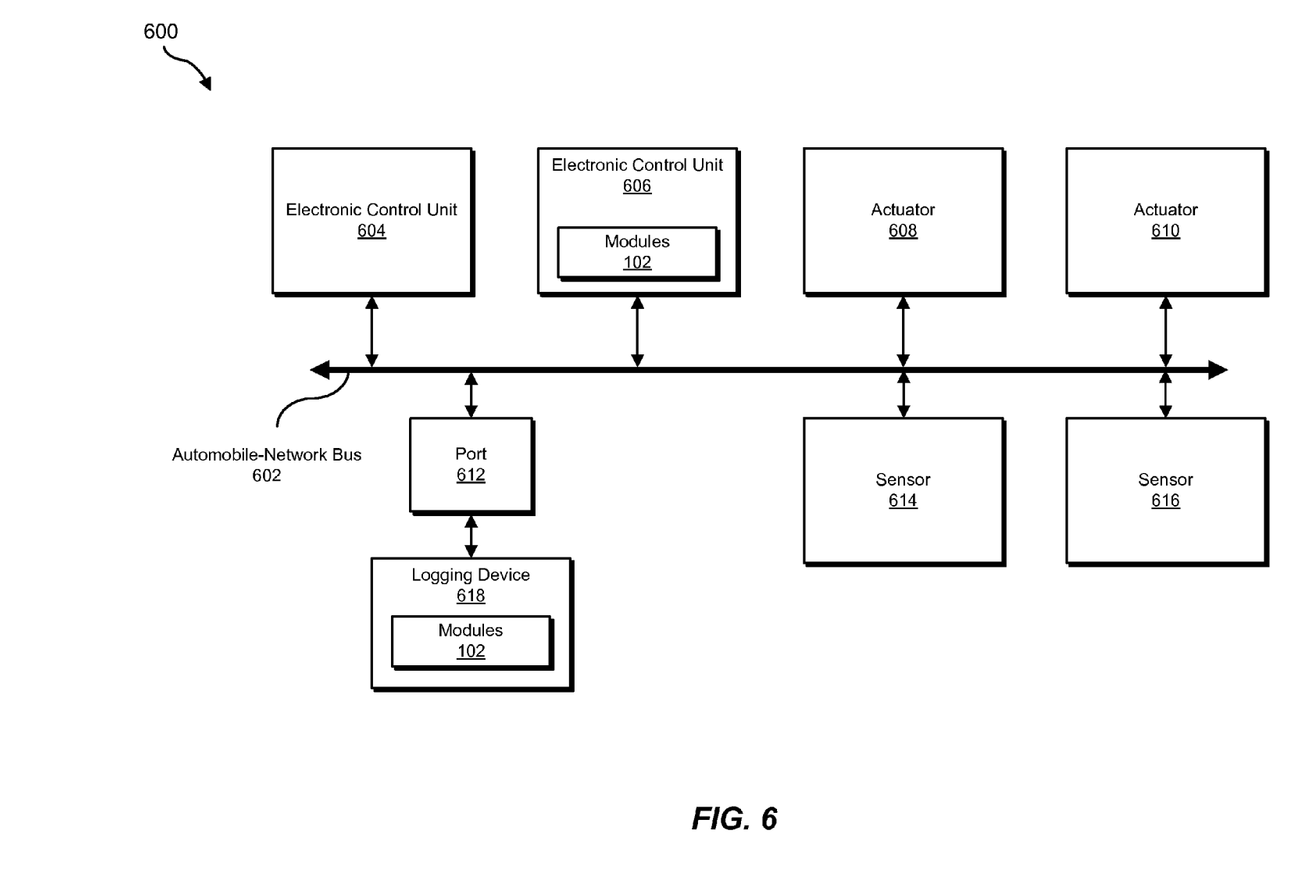
FIG. 6 is a block diagram of an exemplary automobile network.

FIG. 6 is a block diagram of an exemplary automobile network 600 of an automobile. As shown in FIG. 6, exemplary automobile network 600 may include ECUs 604 and 606, actuators 608 and 610, and sensors 614 and 616 connected via a common automobile-network bus 602. ECUs 604 and 606 generally represent any computing device or embedded system that controls or monitors a system or subsystem of an automobile. Examples of ECUs 604 and 606 include, without limitation, engine control units, brake control units, transmission control units, power-steering control units, and power-lock control units.

Actuators 608 and 610 generally represent any mechanical device that actuates a component of an automobile (e.g., throttle actuators, brake actuators, and power-steering actuators), and sensors 614 and 616 generally represent any sensor that measures attributes of an automobile (e.g., speed sensors, accelerometers, throttle position sensors, pedal position sensors, and steering-wheel position sensors, etc.). Automobile-network bus 602 generally represents any in-vehicle bus that interconnects the components of an automobile and that allows the components to exchange data. Examples of automobile-network bus 602 include, without limitation, CAN buses and LIN buses.

As shown in FIG. 6, exemplary automobile network 600 may also include a port 612 through which various devices (e.g., diagnostic, monitoring, or logging devices such as logging device 618) may connect to automobile-network bus 602. Port 612 generally represents an automobile's diagnostic port (such as, e.g., an On-Board Diagnostic (OBD) II port).

Figure 7:
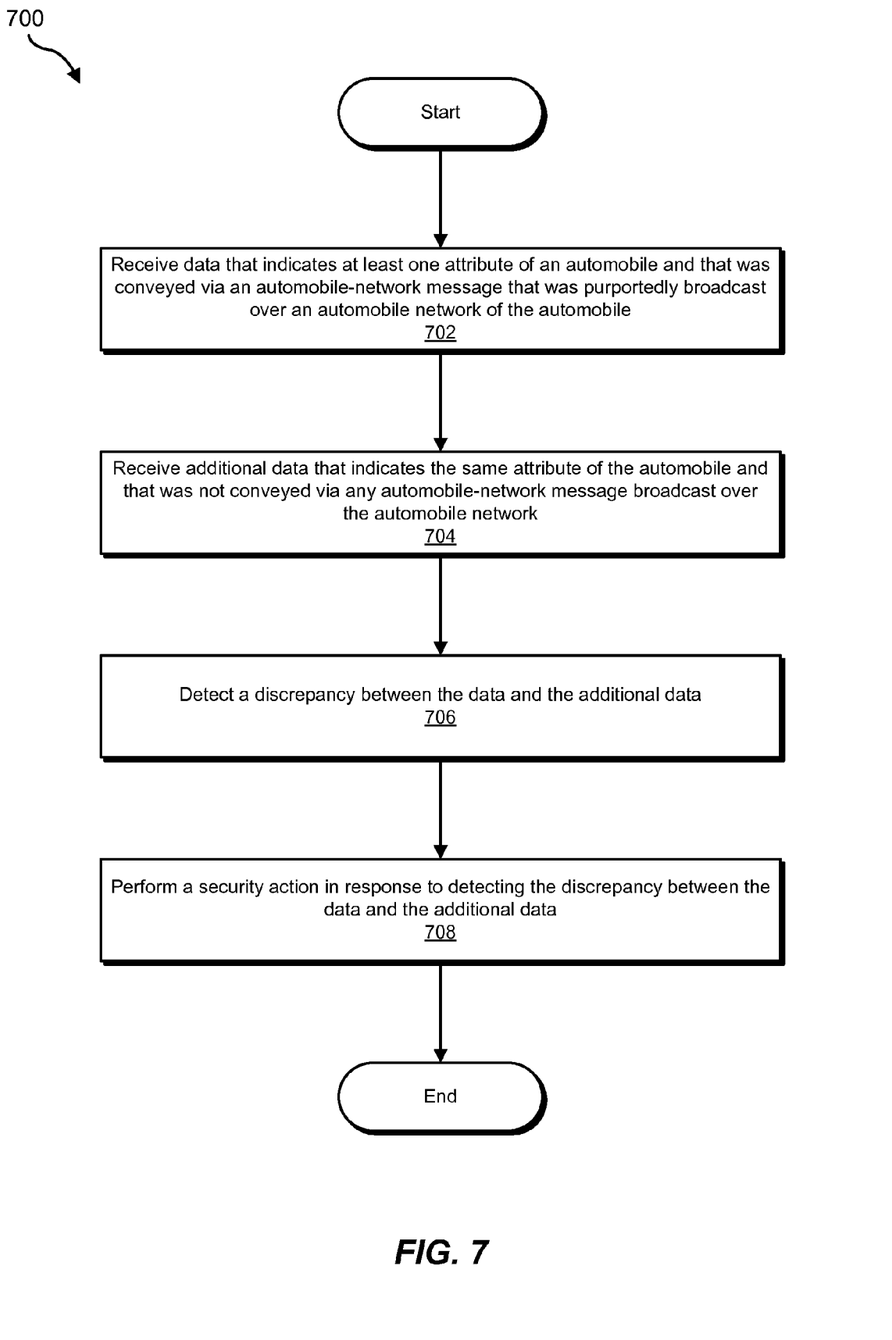
FIG. 7 is a flow diagram of an exemplary method for detecting discrepancies in automobile-network data.

FIG. 7 is a flow diagram of an exemplary computer-implemented method 700 for detecting discrepancies in automobile-network data. The steps shown in FIG. 7 may be performed by any suitable computer-executable code and/or computing system. In some embodiments, the steps shown in FIG. 7 may be performed by one or more of the components of system 100 in FIG. 1, system 200 in FIG. 2, system 300 in FIG. 3, system 400 in FIG. 4, system 500 in FIG. 5, automobile network 600 in FIG. 6, and/or computing system 810 in FIG. 8.

As illustrated in FIG. 7, at step 702, one or more of the systems described herein may receive data that indicates at least one attribute of an automobile and that was conveyed via an automobile-network message that was purportedly broadcast over an automobile network of the automobile.

The systems described herein may receive data that indicates an attribute of an automobile and that was conveyed via an automobile-network message that was purportedly broadcast over an automobile network of the automobile in a variety of ways. For example, receiving module 104 may receive automobile-network messages that convey an attribute of an automobile from or as part of a logging device (e.g., computing devices 202, 302, 402, and 502 in FIGS. 2-5 and logging device 618 in FIG. 6) that is (1) configured to log automobile-network messages that are broadcast over an automobile's automobile network and that (2) is intended to be plugged directly into the automobile network when the automobile is being driven. Additionally or alternatively, receiving module 104 may receive automobile-network messages that convey an attribute of an automobile from or as part of an ECU (e.g., computing devices 202, 302, 402, and 502 in FIGS. 2-5 and ECU 606 in FIG. 6) that is connected to the automobile's automobile network and configured to log automobile-network messages broadcast over the automobile's automobile network.

In some examples, receiving module 104 may receive automobile-network messages that are believed to have been logged by a logging device that is intended to be plugged directly into an automobile's automobile network when the automobile was being driven but that were actually logged by the logging device when it was connected to a replay device or a filtering device that falsified the automobile-network messages. As used herein, the term "replay device" generally refers to any device that collects automobile-network messages and that plays back the automobile-network messages to a connected logging device. The term "filtering device," as used herein, generally refers to any pass-through device that sits between an automobile network and a logging device and that modifies automobile-network messages before they reach and are logged by the logging device. As will be explained in greater detail below, the systems and methods described herein may detect automobile-network messages that were logged via a replay device or a filtering device by detecting when the state of an attribute of an automobile conveyed by the automobile-network messages differs from the state of the same attribute conveyed by an alternative source of information about the attribute.

As used herein, the term "automobile-network message" generally refers to any communication that conveys a state (e.g., a current or past value) of any attribute of an automobile and that is transmitted over an automobile network. In some examples, automobile-network messages may be broadcast over an automobile network by various components (e.g., ECUs, sensors, and/or actuators) that are connected to the automobile network. The phrase "attribute of an automobile" generally refers to any measurable characteristic of an automobile or one of its component parts and/or any measurable characteristic of a driver's driving behaviors. An attribute of an automobile may be considered conveyed by an automobile-network message if the attribute can be derived from data contained within the automobile-network message. Examples of automobile attributes include, without limitation, speed, acceleration, deceleration, turning angle, pedal position, steering wheel position, and g-forces.

At step 704, one or more of the systems described herein may receive additional data that indicates the same attribute indicated by the data received at step 702 and that was not conveyed via any automobile-network message that was broadcast over the same automobile network associated with the data received at step 702. The systems described herein may receive such data in a variety of ways. For example, receiving module 104 may receive sensor data that conveys an attribute of an automobile from or as part of a device (e.g., mobile device 206 in FIG. 2, mobile device 306 in FIG. 3, or computing device 402 in FIG. 4) that includes sensors that are capable of measuring the attribute of the automobile with which the device travels.

In some examples, an automobile may include two discrete automobile networks, and different sets of automobile-network messages that convey the same attribute of an automobile may be broadcast over each of the automobile networks. In these examples, receiving module 104 may receive the set of automobile-network messages not associated with the data received at step 702 from or as part of a logging device (e.g., computing devices 202, 302, 402, and 502 in FIGS. 2-5 and logging device 618 in FIG. 6) that is (1) configured to log automobile-network messages that are broadcast over an automobile's automobile network and that (2) is intended to be plugged directly into the automobile network when the automobile is being driven. Additionally or alternatively, receiving module 104 may receive the set of automobile-network messages not associated with the data received at step 702 from or as part of an ECU (e.g., computing devices 202, 302, 402, and 502 in FIGS. 2-5 and ECU 606 in FIG. 6) that is configured to log automobile-network messages broadcast over the automobile's automobile network.

At step 706, one or more of the systems described herein may detect a discrepancy between the data received at step 702 and the additional data received at step 704. The systems described herein may perform step 706 in a variety of ways. In general, detecting module 106 may detect a discrepancy between the data received at step 702 and the additional data received at step 704 by (1) determining that a state of an attribute of an automobile indicated by the data received at step 702 does not match a state of the attribute indicated by the additional data received at step 704 and (2) determining that the data received at step 702 and the additional data received at step 704 indicate that the states occurred at the same time. For example, detecting module 106 may detect a discrepancy between the data received at step 702 and the additional data received at step 704 by determining that a speed conveyed by the data received at step 702 does not match a speed conveyed by the additional data received at step 704, wherein the data received at step 702 and the additional data received at step 704 indicate that the two speeds occurred at the same time.

In some examples, detecting module 106 may determine whether detected discrepancies are indicative of the data received at step 702 having been tampered with, falsified, or collected via a replay or filtering device. Additionally or alternatively, detecting module 106 may determine whether detected discrepancies are indicative of a malfunctioning automobile-network component or an attack on an automobile network (e.g., an attack wherein an attacker floods an automobile network with fake automobile-network messages).

In some examples, detecting module 106 may make the above mentioned determinations based on the amount of discrepancies between the data received at step 702 and the additional data received at step 704. For example, detecting module 106 may determine that the data received at step 702 is likely to have been tampered with, partially falsified, or collected via a filtering device if some of the data received at step 702 matches the additional data received at step 704. Similarly, detecting module 106 may determine that the data received at step 702 is likely to have been completely falsified or collected via a replay device if all or most of the data received at step 702 does not match the additional data received at step 704.

At step 708, one or more of the systems described herein may perform a security action in response to detecting the discrepancy between the data received at step 702 and the additional data received at step 704. Upon completion of step 708, exemplary method 700 in FIG. 7 may terminate. The systems described herein may perform a variety of security actions in response to detecting a discrepancy between the data received at step 702 and the additional data received at step 704. In one example, security module 108 may report the discrepancy to an interested party (e.g., an auto-insurance provider, a driver, an automobile manufacture, a security-service provider, etc.). In some examples, security module 108 may report a discrepancy by flagging the data received at step 702. For example, security module 108 may flag the data received at step 702 as having been tampered with, falsified, or collected via a replay or filtering device. Additionally or alternatively, security module 108 may report a discrepancy by reporting what the discrepancy may imply. For example, security module 108 may report a potential attack on an automobile network or malfunctioning automobile network component if discrepancies between the data received at step 702 and the additional data received at step 704 are indicative of an attack on an automobile network or malfunctioning automobile network component.

As explained above, by comparing (1) automobile-network data that was conveyed by automobile-network messages purportedly broadcast over an automobile network of an automobile with (2) additional data that conveys the same or similar information and that has been acquired from an alternative source (e.g., a source other than automobile-network messages broadcast over the automobile network), the systems and methods described herein may detect when the automobile-network data has been tampered with, played back, and/or otherwise falsified. For example, by identifying a discrepancy between (1) automobile-network data that indicates an attribute of an automobile (e.g., speed, acceleration, etc.) that was conveyed by automobile-network messages purportedly broadcast over an automobile network of the automobile and (2) additional data that indicates the same attribute of the automobile but that was collected via sensors of a mobile device (e.g., a smartphone) travelling with the automobile, these systems and methods may determine that the automobile-network data was tampered with, played back, and/or otherwise falsified.

Furthermore, in some examples, by comparing (1) automobile-network data that was actually conveyed by automobile-network messages broadcast over an automobile network of an automobile with (2) additional data that conveys the same or similar information and that has been acquired from an alternative source, the systems and methods described herein may detect attacks on the automobile network and/or malfunctioning components within the automobile network.

Figure 8:
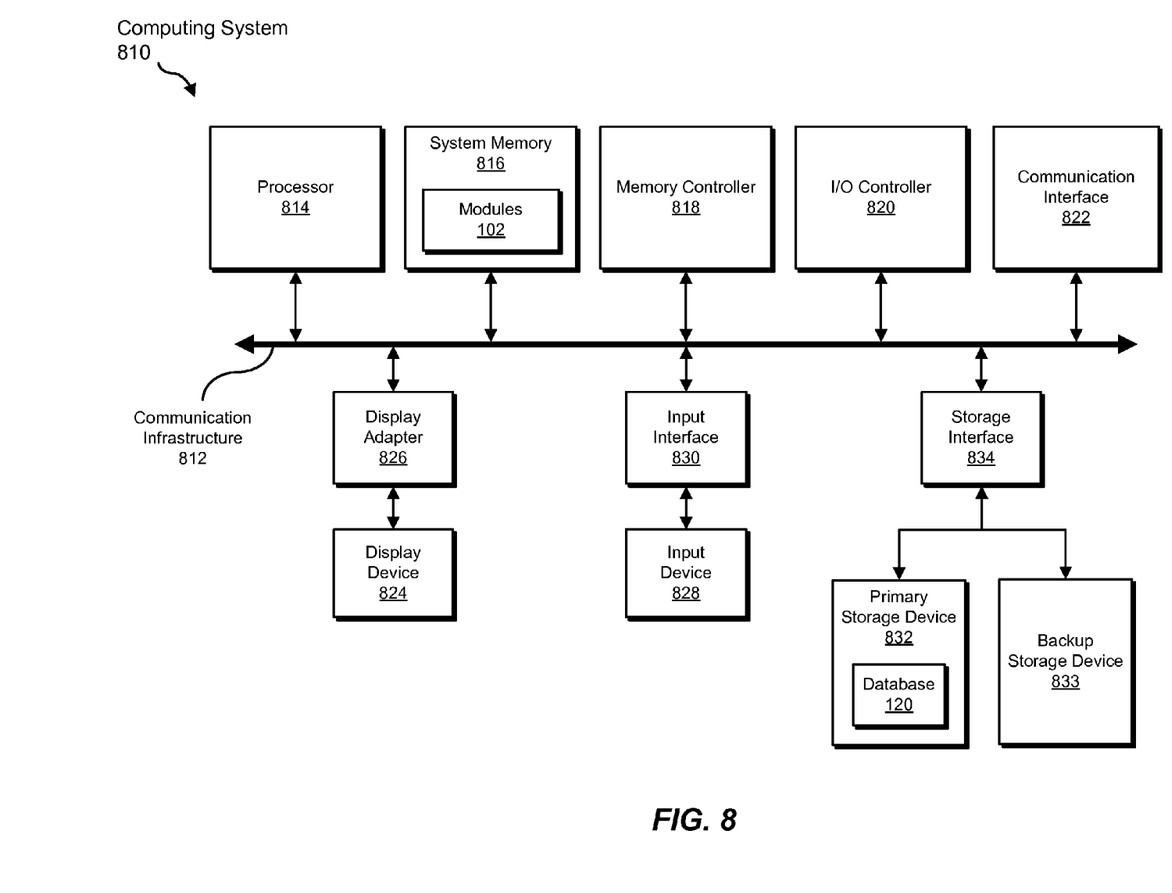
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 7). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive (a) data that indicates at least one attribute of an automobile and that was conveyed via an automobile-network message that was purportedly broadcast over an automobile network of the automobile and (b) additional data that indicates the same attribute of the automobile and that was not conveyed via any automobile-network message that was broadcast over the automobile network, transform the data and the additional data into a determination that there is a discrepancy between the data and the additional data, output a result of the transformation to a system that may perform a security action in response to the determination, use the result of the transformation to flag the discrepancy between the data and the additional data, and store the result of the transformation to a storage system that tracks discrepancies in automobile-network data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting discrepancies in automobile-network data, at least a portion of the method being performed by a computing device comprising at least one processor, the method comprising:
   receiving, via a logging device, data that indicates a first state of at least one attribute of an automobile at a moment in time, wherein:
      the data has been conveyed via an automobile-network message that was purportedly broadcast over an automobile network of the automobile; and
      the logging device is configured to:
         connect to the automobile network via a port of the automobile network; and
         log automobile-network messages that:
            are broadcast over the automobile network; and
            convey states of the attribute of the automobile;
   receiving, via at least one sensor of a mobile device, additional data that indicates a second state of the same attribute of the automobile at the same moment in time, wherein the mobile device was traveling with the automobile when the automobile-network message was logged by the logging device;
   detecting a security incident by determining that a difference between the first state and the second state is indicative of the automobile-network message having been falsified; and
   performing a security action by flagging the data as having been falsified.

2. The computer-implemented method of claim 1, wherein:
   the data is received from the logging device by the mobile device;
   the steps of detecting the security incident and performing the security action are performed by the mobile device; and
   performing the security action comprises reporting the security incident to a cloud-based computing system.

3. The computer-implemented method of claim 2, wherein:
   the data is received from the logging device by a cloud-based computing system;
   the additional data is received from the mobile device by the cloud-based computing system; and
   the steps of detecting the security incident and performing the security action are performed by the cloud-based computing system.

4. The computer-implemented method of claim 1, wherein:
   detecting the security incident comprises determining that the difference between the first state and the second state is indicative of the automobile-network message having been tampered with; and
   performing the security action comprises flagging the data as having been tampered with.

5. The computer-implemented method of claim 1, wherein:
   detecting the security incident comprises determining that the difference between the first state and the second state is indicative of the automobile-network message having been collected from a replay device that replayed the automobile-network message; and
   performing the security action comprises flagging the data as having been collected from the replay device.

6. The computer-implemented method of claim 1, wherein:
   detecting the security incident comprises determining that the difference between the first state and the second state is indicative of the automobile-network message having been collected from a filtering device that filtered the automobile-network message; and
   performing the security action comprises flagging the data as having been collected from the filtering device.

7. The computer-implemented method of claim 1, wherein the automobile-network message was broadcast over the automobile network by a source device connected to the automobile network.

8. A system for detecting discrepancies in automobile-network data, the system comprising:
   at least one receiving module, stored in memory, that:
      receives, via a logging device, data that indicates a first state of at least one attribute of an automobile at a moment in time, wherein:
         the data has been conveyed via an automobile-network message that was purportedly broadcast over an automobile network of the automobile; and
         the logging device is configured to:
            connect to the automobile network via a port of the automobile network; and
            log automobile-network messages that:
               are broadcast over the automobile network; and
               convey states of the attribute of the automobile;
      receives, via at least one sensor of a mobile device, additional data that indicates a second state of the same attribute of the automobile at the same moment in time, wherein the mobile device was traveling with the automobile when the automobile-network message was logged by the logging device;
   a detecting module, stored in memory, that detects a security incident by determining that a difference between the first state and the second state is indicative of the automobile-network message having been falsified;
   a security module, stored in memory, that performs a security action by flagging the data as having been falsified; and
   at least one physical processor that executes the receiving module, the detecting module, and the security module.

9. The system of claim 8, wherein:
   the receiving module receives the data from the logging device as part of the mobile device;
   the mobile device comprises the detecting module and the security module; and
   the security module performs the security action by further reporting the security incident to a cloud-based computing system.

10. The system of claim 8, wherein:
the detecting module detects the security incident by determining that the difference between the first state and the second state is indicative of the automobile-network message having been tampered with; and
the security module performs the security action by further flagging the data as having been tampered with.

11. The system of claim 8, wherein:
the detecting module detects the security incident by determining that the difference between the first state and the second state is indicative of the automobile-network message having been collected from a replay device that replayed the automobile-network message; and
the security module performs the security action by further flagging the data as having been collected from the replay device.

12. The system of claim 8, wherein:
the detecting module detects the security incident by determining that the difference between the first state and the second state is indicative of the automobile-network message having been collected from a filtering device that filtered the automobile-network message; and
the security module performs the security action by flagging the data as having been collected from the filtering device.

13. A non-transitory computer-readable medium comprising one or more computer-executable instructions that, when executed by at least one processor of a computing device, cause the computing device to:
receive, via a logging device, data that indicates a first state of at least one attribute of an automobile at a moment in time, wherein:
the data has been conveyed via an automobile-network message that was purportedly broadcast over an automobile network of the automobile; and
the logging device is configured to:
connect to the automobile network via a port of the automobile network; and
log automobile-network messages that:
are broadcast over the automobile network; and
convey states of the attribute of the automobile;
receive, via at least one sensor of a mobile device, additional data that indicates a second state of the same attribute of the automobile at the same moment in time, wherein the mobile device was traveling with the automobile when the automobile-network message was logged by the logging device;
detect a security incident by determining that a difference between the first state and the second state is indicative of the automobile-network message having been falsified; and
perform a security action by flagging the data as having been falsified.

\* \* \* \* \*